Dec. 22, 1953   L. WALLACE   2,663,211
FINGER TO PIANO KEY INDICATOR
Filed Aug. 31, 1951

*INVENTOR.*
LETA WALLACE
BY
ATTORNEY

Patented Dec. 22, 1953

2,663,211

UNITED STATES PATENT OFFICE 2,663,211

FINGER TO PIANO KEY INDICATOR

Leta Wallace, Kansas City, Mo., assignor of one-third to Amy Winning, Kansas City, Mo.

Application August 31, 1951, Serial No. 244,509

2 Claims. (Cl. 84—485)

This invention relates to an improvement in a finger to piano key indicator guide with reference indicia to be used for all general scales.

Heretofore, several slide rule indicators have been on record for teaching chords and the fingering thereof and at least one illustrates a single slide for fingering for the left hand and right hand with the fingering unevenly spaced on the slide.

The present improved invention is the provision of a guide that is inserted between the black keys of the piano and the piano case having a series of guide arrow heads spaced thereon for a general scale, a key-note indicator to indicate the selected key to be played and for the positioning of the guide for each arrow head pointing to the respective key of the key-note scale.

Another object of the improved guide is the addition of a slide or slides being on the guide and having uniform fingering indicia to register with the nearest arrow heads pointing to the keys of a piano whether they be black or white and the arrows being properly spaced for a scale of the selected key-note whether the keys be black or white, a window on the guide, and a plurality of groups of key indicia spaced on the slide, each registering with the window of the guide for the selected key-note arrow when placed or pointed toward the piano key.

Another object of the present invention is to provide a guide with a row of arrow heads spaced thereon for a general scale, one row of arrows for a major scale, and another row for a harmonic minor scale, in either case the arrow heads pointing to the respective piano keys of a scale, a key-note indicator to indicate the scale key to be played and position the guide for each arrow head pointing to the respective key of the key-note scale. The major general scale arrow heads are spaced as follows according to the keys of the piano, beginning from the left one key space, one key space, one half space, one space, one space, one space, one half space, one space, one space, one half space, one space, one space, one space and one half space, making preferably a two octave scale. In the harmonic minor general scale the arrows spaced beginning at the left, one space, one half space, one space, one space, one half space, one and one half spaces, one half space, one space, one half space, one space, one space, one half space, one and one half spaces, and one half space making preferably a two octave scale for the harmonic minor general scale. Placing this guide with either general scale thereon directly on the piano it will be found that the preferable key-note middle arrow points to the selected key whether it be white or black and all of the other arrows point to their respective keys for the selected scale.

Another object of the present invention is to provide a guide member with indicia for the keys of a piano, a slide member having means to hold the slide to the guide member, a plurality of scale finger indicia all being equally spaced on the slide member, a plurality of key scale indicia being spaced on the slide member, means to register the scale indicia and finger indicia with the indicia for the keys of a piano for a selected scale, and a register point in said guide for the first key of the selected scale.

With these objects in view the invention may be more fully understood from the accompanying drawing, the following specification and scope of the appended claims.

Figure 1:
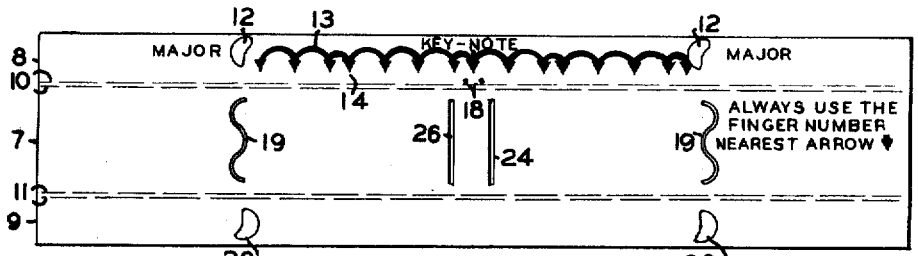
Figure 1 is a flat view of the unfolded guide member with the major general scale arrow spacing thereon.
Figure 2:
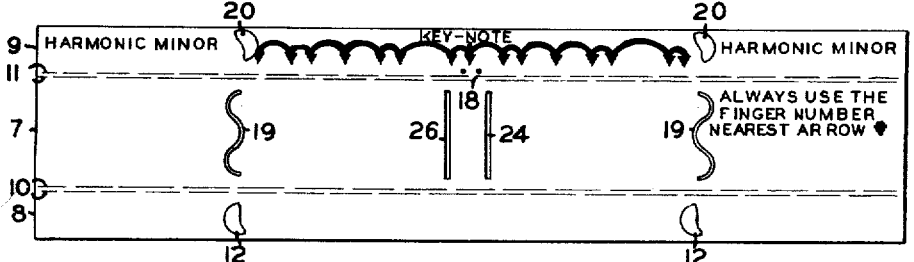
Figure 2 is a view of the reverse side of Figure 1 indicating the general harmonic minor scale arrow head spacing.
Figure 3:
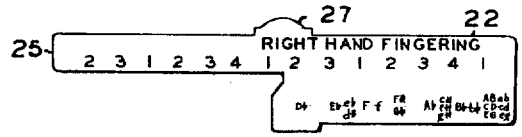
Figure 3 is a view of a right hand fingering slide member.
Figure 4:
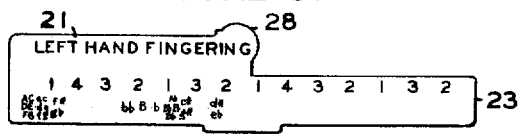
Figure 4 is a view of a left hand fingering slide member.

The unfolded guide member as illustrated in Figure 1 is made from a rectangular flat member 7 having narrow portions 8 and 9 and longitudinal fold lines 10 and 11, the narrow portion 8 is provided with a pair of windows 12 and preferably a continuous arrow 13 having a multiple or plurality of heads or arrow points 14. The number of the arrow heads 14 are preferably illustrated for two full scales and point directly to the keys of a piano when the folds 10 of guide members 7 with narrow portion 8 are inserted between the black keys 15 and the piano case 16, the guide 7 or folds 10 resting upon the white keys 17. Only one white and one black key is illustrated but it is well known that the piano has a plurality of black and white keys.

Preferably the middle arrow 14 is designated as the keynote and has further identification by two dots 18 below the arrow point for alignment with a piano key. The narrow portion 8 has the word major near each window 12 therein and is used for any key in the major scale.

The standard key board and scales of a piano are well known and are well illustrated in many references of prior patents and it is not deemed necessary to repeat the scales or keys in this patent application.

From a careful study of the arrow heads 14 the major scale spacing beginning from the left, from the first arrow head to the second arrow head is the spacing from the center to center of two white keys on a piano. Therefore to designate the keys for a general scale as illustrated the spacing between arrows beginning at the left are; one space, one space, one half space, one space, one space, one space, one half space to the key-note or center note designating one complete octave. To the right of the key-note is another octave of spaced arrow heads like the preceding described octave of arrow heads.

The slots 19 in guide member 7 are preferably curved to include the register with the farthest end curved of the windows 12 and 20 and are provided for the reception and exposure of the slide members 21 and 22, the left hand end of the slide 21 is inserted in the left hand slot 19 and the right hand end 23 of the slide member 21 is inserted in the lower portion of slot 24. The right hand end of the slide member 22 is inserted in the right hand slot 19 and the left hand end 25 of slide member 22 is inserted in the upper portion of the vertical slot 26.

Figure 6:
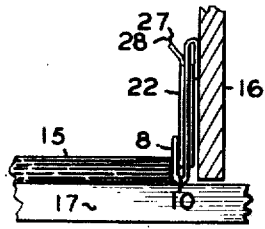
Figure 6 is a slightly enlarged fragmentary view illustrating one end of the guide and slides inserted on top of the white keys of a piano and between the black keys and the piano case.

It is obvious from Figures 1 and 6 that the narrow portion 8 folds back against guide member 7 and the narrow portion 9 folds forward against the guide member 7. The narrow portion 8 is used with the slides 21 and 22 on the far side of Figure 1 for the major general scale and the narrow portion 9 is used with the slides 21 and 22 on the near side of Figure 1 for the minor scales, the slides being manually interchangeable for the two sides of the guide member 7.

The left hand slide 21 has a plurality of spaced group indicia thereon for registering with the left hand window 12 on the major scale or window 20 on the harmonic minor scale. The right hand slide 22 has a plurality of spaced group key indicia thereon for registering with the right hand window 12 or 20. The key indicia group spacing on the slides is spaced the same as the finger spacing indicated by the numerals thereon except preferably off set or staggered to register with the windows 12 and 20.

Figure 5:
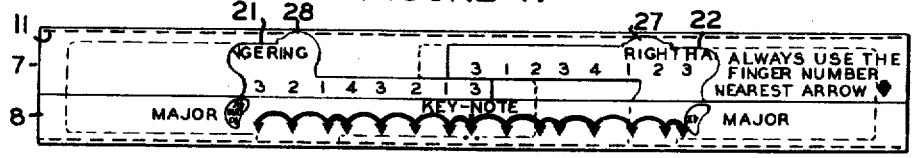
Figure 5 illustrates the assembled guide and slide members for the major scale.

Figure 5 illustrates the assembled guide and slides with the narrow portion 8 exposed for the major general scale. Each slide has been manually moved by tabs 27 and 28 until E flat is exposed in each window 12. Now it is obvious that the finger indicia or reference numerals are evenly spaced throughout the spacing of arrow heads and the numeral nearest the arrow head is the correct one to use. Any other key may be selected in the same manner. The major scale indicia for the scale is made in capital letters and the minor scale indicia is made in small or lower case letters.

Assume that the key of C scale is to be played. Place the key-note arrow directly over the exposed white portion of the key C near the piano case and all arrows will point to the white keys. The pair of arrows on each half space will point to the two white keys between the black keys for instance B and C or E and F. Now select the illustrated E flat scale. Place the key-note on black key E flat, the next arrow points to white key F, next arrow to white key G, next arrow to black key A flat, next arrow to black key B flat, next arrow to white key C, the next arrow points to white key D, and the next or octave key points to black key E flat. Any of the other scale keys will work in a similar way for the correct keys.

What I claim as new and desire to secure by Letters Patent is:

1. An indicator for correct fingering of a piano comprising an S-shaped holder, a slide of flat material having a right hand portion narrower than a left hand portion and having indications thereon for the left hand fingering fitted into one portion of said S-shaped holder, a second slide of flat material having a right hand portion wider than the left hand portion and having indications thereon for the right hand fingering, said second slide being fitted into another portion of said S-shaped holder parallel to said first slide.

2. An indicator such as claimed in claim 1 in which the wider section of said first slide extends upward and in which the wider portion of said second slide extends downward, whereby, as the slide is operated, the narrow portions of the slides will assume complementary positions, one above the other.

LETA WALLACE.

References Cited in the file of this patent

UNITED STATES PATENTS

| Number | Name | Date |
|---|---|---|
| 877,259 | Thrash | Jan. 21, 1908 |
| 2,188,098 | Bostelmann, Jr. | Jan. 23, 1940 |
| 2,322,465 | Mihailoff | June 22, 1943 |
| 2,632,963 | Drury | Mar. 31, 1953 |